(12) United States Patent
Dann et al.

(10) Patent No.: US 9,299,150 B2
(45) Date of Patent: Mar. 29, 2016

(54) RECORDING THE LOCATION OF A POINT OF INTEREST ON AN OBJECT

(75) Inventors: Lee Dann, Worcester (GB); Joerg Reitmann, Harsefeld (DE)

(73) Assignee: Airbus Operations Limited, Bristol (GB)

( * ) Notice: Subject to any disclaimer, the term of this patent is extended or adjusted under 35 U.S.C. 154(b) by 464 days.

(21) Appl. No.: 13/575,400

(22) PCT Filed: Feb. 17, 2011

(86) PCT No.: PCT/EP2011/052378
§ 371 (c)(1),
(2), (4) Date: Jul. 26, 2012

(87) PCT Pub. No.: WO2011/104167
PCT Pub. Date: Sep. 1, 2011

(65) Prior Publication Data
US 2012/0300984 A1  Nov. 29, 2012

(30) Foreign Application Priority Data

Feb. 23, 2010 (GB) .................................. 1002973.4

(51) Int. Cl.
*G06K 9/00* (2006.01)
*G06T 7/00* (2006.01)
*G06T 19/00* (2011.01)
*B64F 5/00* (2006.01)
*G07C 3/00* (2006.01)

(52) U.S. Cl.
CPC ............. *G06T 7/0046* (2013.01); *G06T 19/006* (2013.01); *B64F 5/0009* (2013.01); *G06T 2207/10016* (2013.01); *G06T 2207/20101* (2013.01); *G06T 2207/20221* (2013.01); *G07C 3/00* (2013.01)

(58) Field of Classification Search
USPC .................................................. 382/141–152
See application file for complete search history.

(56) References Cited

U.S. PATENT DOCUMENTS

| 5,828,969 A | 10/1998 | Chamney et al. |
| 6,068,482 A | 5/2000 | Snow |
| 2003/0059103 A1* | 3/2003 | Shiomi et al. ................. 382/144 |
| 2006/0285755 A1* | 12/2006 | Hager et al. .................. 382/224 |
| 2009/0208079 A1 | 8/2009 | Vaillant et al. |

FOREIGN PATENT DOCUMENTS

| JP | 2009/108849 | 5/2009 |
| WO | WO 2005/004743 | 1/2005 |
| WO | WO 2007/143085 | 12/2007 |

OTHER PUBLICATIONS

International Search Report for PCT/EP2011/052378 mailed May 27, 2011.
Written Opinion of the International Searching Authority mailed May 27, 2011.

(Continued)

*Primary Examiner* — Alex Liew
(74) *Attorney, Agent, or Firm* — Nixon & Vanderhye P.C.

(57) ABSTRACT

A method of recording the location of a point of interest on an object, the method comprising capturing a digital image of an object having a point of interest, accessing a three-dimensional virtual model of the object, aligning the image with the model, calculating the location of the point of interest with respect to the model, and recording the calculated point of interest location. Also, a system for performing the method.

20 Claims, 1 Drawing Sheet

(56) References Cited

OTHER PUBLICATIONS

GB 1002973.4 Search Report dated Jun. 17, 2010.
H. Lipson et al., "Online Product Maintenance by Web-Based Augmented Reality", CIRP Seminar STC Design: Newtools and Workflows for Product Development, 1998, 12 pages.
P. Georgel et al., An Industrial Augmented Reality Solution for Discrepancy Check:, 2007 $6^{th}$ IEEE and ACM International Symposium on Mixed and Augmented Reality, ISMAR—2007 $6^{th}$ IEEE and ACM International Symposium on Mixed and Augmented Reality, ISMAR 2007 Inst. Of Elec. And Elec. Eng. Computer Society US, 2007, 4 pages.

* cited by examiner

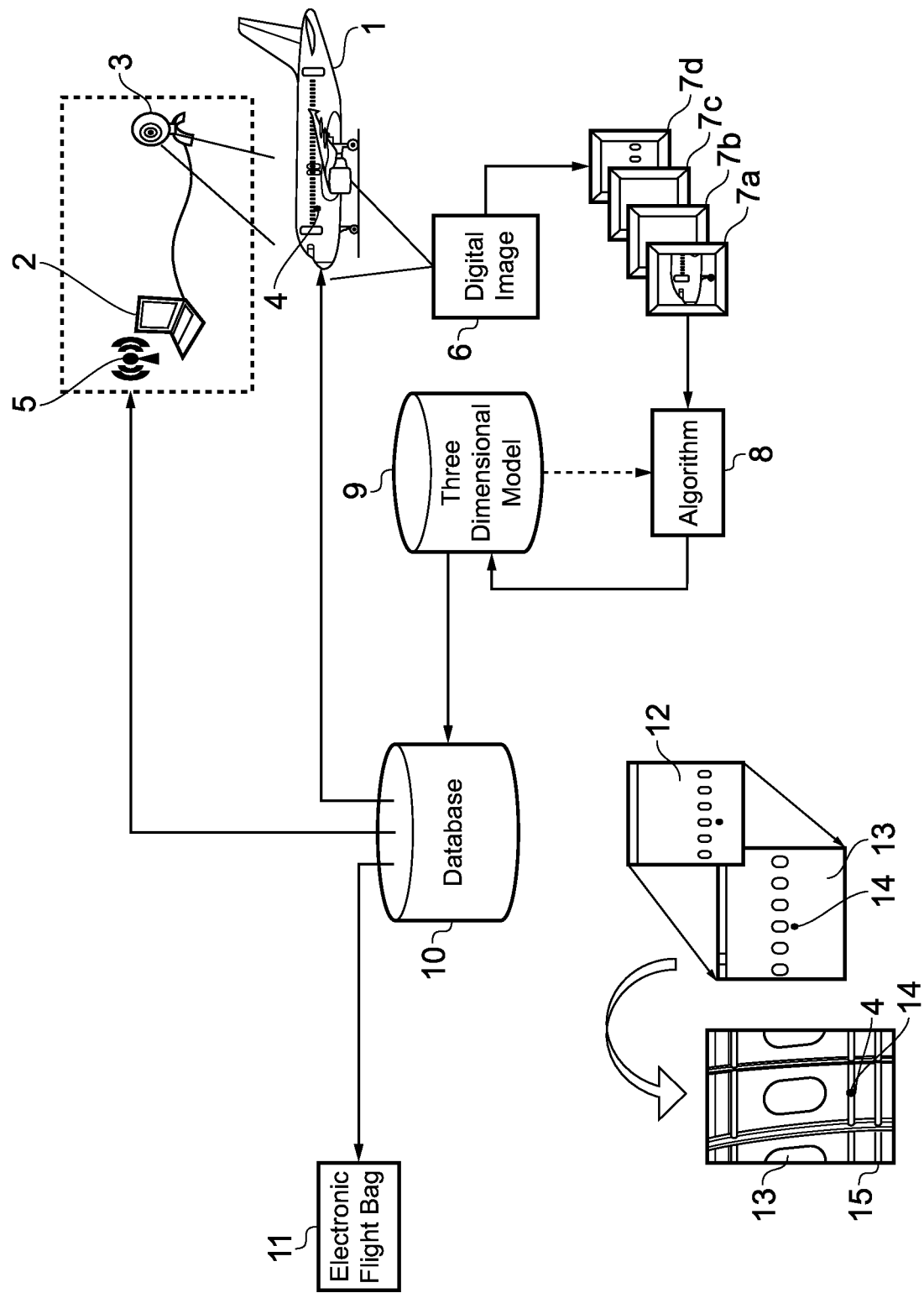

RECORDING THE LOCATION OF A POINT OF INTEREST ON AN OBJECT

This application is the U.S. national phase of International Application No. PCT/EP2011/052378 filed 17 Feb. 2011 which designated the U.S. and claims priority to GB 1002973.4 filed 23 Feb. 2010, the entire contents of each of which are hereby incorporated by reference.

FIELD OF THE INVENTION

The present invention relates to a method of recording the location of a point of interest on an object. In particular, though not exclusively, the invention relates to recording the location of a point of interest on a vehicle, such as an aircraft or automobile.

BACKGROUND OF THE INVENTION

At present, the location of any points of interest on an aircraft external surface is typically made by human assessment. This involves taking measurements from known reference positions such as stations or frames, body lines, water lines, stringers, production joints, access panels, or specific structural features. This can be particularly difficult on large modern aircraft that have expanses of featureless surfaces. For example, the surface of a modern composite aircraft will not have the vast number of rivet lines visible on traditional metallic aircraft.

Location referencing is usually made from two-dimensional drawings (found within aircraft manuals) to establish the known datums from which the measurements are made. Human error sometimes means that the measured locations are not accurate and any subsequent engineering follow up action or further assessment is delayed, or needs to be assessed differently to that initially anticipated. The locations of any points of interest which are found to be damage are recorded on a document generally known as the 'Dent & Buckle' chart.

U.S. Pat. No. 5,828,969 describes an aircraft maintenance control process, which involves photographing a damaged component with a digital camera, downloading the image data to a database to produce a record, visually assessing the damage, and annotating the electronic record with instructions for repair. Whilst this process produces a more accessible, comprehensive record, it does not address the problems of human error in accurately recording the damage location.

SUMMARY OF THE INVENTION

A first aspect of the invention provides a method of recording the location of a point of interest on an object, the method comprising capturing a digital image of an object manufactured according to a design specification and having a point of interest, marking the position of the point of interest on the captured image, accessing a three-dimensional virtual design model of the object, aligning the image with the model, using an algorithm to calculate the location of the point of interest with respect to the model based upon the position of the point of interest marked on the captured image, and recording the calculated point of interest location.

A further aspect of the invention provides a system for recording the location of a point of interest on an object manufactured according to a design specification, the system comprising: a digital image capturing device; a processor; and a storage device, wherein the storage device has stored therein a three-dimensional virtual design model of the object and instructions for the processor to perform the steps of: retrieving a captured digital image of the object having the point of interest; marking the position of the point of interest on the captured image; accessing the three-dimensional virtual model of the object; aligning the image with the model; running an algorithm to calculate the location of the point of interest with respect to the model based upon the point of interest marked on the captured image; and recording the calculated point of interest location.

The invention is advantageous in that the point of interest location on the object can be accurately recorded by reducing inaccuracies due to human error.

Marking the position of the point of interest on the captured image may be performed automatically, such as by a point of interest recognition routine for example, or manually. For instance, a coloured marker dot may be physically applied to the object surface at the actual point of interest location prior to image capture. The point of interest recognition routine may be adapted to recognise the marker dot and automatically mark the point of interest location on the image.

Alternatively, no marked dots may be used and the point of interest recognition routine may be adapted to recognise one or more predetermined characteristics of the image, such as indents or scratches on the object surface.

For manual marking, the captured image may be displayed and a pointing device, such as a mouse, may be used to select the point of interest location on the image. Again, marker dots may be used to assist in the manual marking process, where the point of interest would otherwise be difficult to identify on the image. The point of interest location may then be calculated based upon the position of the point of interest marked on the captured image.

The image may be prepared by stitching multiple images, including at least a reference view of at least part of the object, and a detailed view of the point of interest. Image stitching is a well known computational tool whereby a plurality of overlapping images are combined to produce a single image. It is commonly performed where the required final image has a wider field and/or higher resolution than is possible with a particular image capturing device from a single captured image.

For example, a wide field image may be created by stitching multiple adjacent narrow field images together to form a panorama. A high resolution image may be created by stitching multiple adjacent low resolution images of higher focal length together (also known as super resolution).

The image created by image stitching is preferably of generally low resolution with high resolution regions around the point(s) of interest. In this way, the user may view the reference image to see where the point of interest lies, and then may zoom in on the point of interest to view it in detail. Zooming in on other areas of the image will reveal limited detail due to the low resolution in those areas. This target generated image is faster to capture and the captured image will be of a more manageable data size than if a large scale high resolution image is created.

The image may be automatically aligned with the model by identifying reference points on the image and adjusting one or more image parameters to align the reference points with corresponding points identified in the model. The reference point may be virtually any recognisable feature on the object and its model, such as an edge line, hole or corner, for example. The alignment may be performed by an image recognition tool. Alternatively, a user may manually align the image with the model by creating a reference point on the image and associating this with its corresponding point on the model. This process may need to be repeated several times for multiple reference points for correct alignment.

The calculated point of interest location data may be recorded in an object specific point of interest layer associated with the model. The term object specific means that the layer is specific to that same object which has been imaged, not specific to a family of similar objects which may have been manufactured according to a design specification. On the other hand, the model will be generic to that design specification. In other words, the model is model specific, whereas the layer is object specific.

The object specific point of interest layer may include text and/or image(s) associated with each point of interest location. The text and/or image(s) may be used to provide detail about each point of interest. Interrogating each point of interest can reveal whatever text and/or images have been associated with that point of interest.

The object specific point of interest layer may be displayed over the three-dimensional model. The object specific point of interest layer may further include the captured image, and the displayed model may show the aligned image rendered on the model. This allows the user to essentially view the model in a way that most closely represents the real-world object. This may be particularly beneficial to an engineering support team or manufacturer, for example, which does not have direct access to the object.

The method may further comprise displaying the object specific point of interest layer over, and aligned with, a live stream digital image of the object. The image capturing device may be a digital video or webcam type device, and the live stream video images captured by the device may be displayed in real time. The processor may perform the steps of aligning the instantaneous video image with the model in real time and then display the object specific point of interest layer associated with the model over, and aligned with, the video image. This is particularly beneficial to an inspection and reporting team, tasked with inspecting and recording points of interest on the object.

The point of interest location data in the object specific point of interest layer may be displayed as a symbol. In this way, the live video image of the object being displayed may be overlaid with a symbol indicative of each point of interest location that has previously been recorded for that object.

As the video image of the object moves, so does the aligned point of interest layer such that the point of interest symbols "move" with the moving video image. The model itself may or may not be superimposed on the video image being displayed, as desired. Any text or images associated with each point of interest may be interrogated by the user.

This is particularly powerful, as it enables the user to quickly identify the previously recorded points of interest for that object, as the object is being viewed. The user may, for instance, assess any changes to the previously recorded point of interest and make any necessary updates to the record. The user may also quickly ascertain that the record for that point of interest is complete and waste no time in moving on to assessing the next point of interest. The user may also quickly identify that a point of interest visible on the object has not been previously recorded and may accurately record that new point of interest.

The calculated point of interest location may be recorded in an object specific point of interest database or logbook. The object specific database or logbook may include text and/or image(s) associated with each point of interest location. The object specific database may include model file data.

In a preferred embodiment, the point of interest is damage to the object. The recorded damage data may be used by a supporting engineering team which does not have direct access to the object. Manipulation of the model will enable the engineering team to visualise any systems and components installed inside the object so that any subsequent repair action can be planned according to the time available. Moreover, the recorded damage data can be used by others during any follow up activity such as during a repair operation to ensure that the correct repair is carried out at the correct location. Once the repair has been carried out, the damage data can be updated to include details of the repair as a historical record.

However, the point of interest may be virtually any feature of the object that is of interest. For example, if certain points on the object are susceptible to changing colour, these may be the points of interest.

In a preferred embodiment, the object is a vehicle, or a part thereof. In particular, the vehicle may be an aircraft or motor vehicle. In the case of an aircraft, use of the invention can provide a reduction in operational disruptions, reduction in risk of lost revenue to the airlines, less inconvenience to passengers, and less disruption for airport authorities. In the case of a motor vehicle, the invention may be used by vehicle fleet managers such as car hire depots for damage tracking on specific vehicles.

BRIEF DESCRIPTION OF THE DRAWINGS

Embodiments of the invention will now be described with reference to the accompanying drawing, in which:

FIG. 1 illustrates a system for recording the location of damage to an aircraft.

DETAILED DESCRIPTION OF EMBODIMENT(S)

A purely exemplary embodiment of this invention will now be described with reference to FIG. 1, for recording the location of damage to an aircraft.

In this embodiment the object is an aircraft and the point(s) of interest are damage to the aircraft. During normal aircraft operations, a visual inspection of the outer surface of the aircraft is made whilst the aircraft is on the ground after each landing. The inspection is intended to identify any scratches, dents etc. which may impact on the operability of the aircraft. Generally, any defect greater than the size of a human thumbnail needs to be identified.

The inspection is performed by ground crew and damage is recorded using the system shown in FIG. 1. The ground crew perform a walk around of the aircraft 1 and visually check the aircraft for damage. Upon finding visible damage to the aircraft, a portable electronic device 2, such as a notebook, having a digital image capturing device 3, such as a web-cam, connected thereto is used to capture a digital image of the damage 4. The portable electronic device could be one of several appropriate devices, such as a mobile telephone, PDA, palm-top computer etc. The digital image capturing device could be one of several appropriate devices, such as a digital camera, digital video recorder etc. The digital image capturing device could be part of the portable electronic device, or connected to it as shown in FIG. 1. The portable electronic device 2 is wirelessly connected to a network using a wireless interface 5.

A digital image 6 of the damage 4 is captured using a defined sequence of digital images 7a-7d. The sequence starts with a semi-aircraft reference view 7a and finishes with a detailed close up view 7d of the damage 4. To assist the process, small marker dots can be temporarily applied to the aircraft 1 adjacent to the damage 4. For instance, a minor dent on a large white painted aircraft panel which may be visible close up may not be visible on the screen of the portable device 2 in the reference view 7a. The marker dot (which may be a small coloured sticker) ensures that all of the images 7a-7d include the damage 4 in the field of view. The marker dot can be removed from the aircraft immediately after the images have been captured.

The reference view 7a includes key reference features of the aircraft such as the cockpit windows and the door as shown in captured image 7a. The detailed view 7d has a far shorter focal length than the view 7a and includes only the damage 4 and its immediate surrounding area on the surface of the aircraft 1.

The digital image 6 is constructed by stitching together the sequence of images 7a to 7d using an image stitching routine run by a processor of the portable device 2. The image 6 is of generally low resolution, with a region of high resolution in the vicinity of the damage 4.

The damage location is then marked on the digital image 6. The location of the damage 6 can either be marked automatically using image recognition to identify the damage 4 (or the marker dot, if applied), or manually. In the case of manual marking, a pointing device such as a mouse connected to the portable device 2 can be used to mark a point on the image 6 displayed on the device 2 corresponding to the location of the damage 4.

The processor of the portable device 2 then runs an algorithm 8 to accurately calculate the location of the damage 4. The algorithm 8 accesses a three-dimensional model 9 of the aircraft 1. The model 9 may be stored locally on the portable device 2 or may be remotely accessible via the wireless interface 5. The model 9 is a master three-dimensional digital mock up (DMU) of the aircraft 1. The model 9 will, in most cases, be generic to the aircraft type and not specific to the particular aircraft 1.

The algorithm 8 works by identifying reference points on the image 6 by making reference to the model 9. The reference points may be virtually any recognisable hard feature on the aircraft 1, such as a station or frame, body line, water line, stringer, production joint, access panel, or a specific structural feature. The algorithm 8 uses known measurements (from the model 9) between the reference points it has identified, together with the marked damage location on the image 6, to calculate an accurate location of the damage 4.

The calculated location of the damage 4 is output to an aircraft specific damage database 10. The database 10 stores information about the aircraft 1. This information may include one or more of the location, history, repair status, severity etc. of each recorded damage. The database may also include photographs and/or text associated with each damage. The photographs may be the images 7a-7d initially captured, and/or additional images. The text may include annotations about the type of damage, repair instructions, details of any previous repair etc. The database 10 may be arranged similar to a logbook, for example.

The database 10 may include details of the entire aircraft 1, or may include details of individual aircraft components. In the case of the latter, individual components making up the aircraft 1 may be collectively identified. In this way, if a component is removed from one aircraft for repair, and is later installed on a different aircraft, the part number of the transferred component can be used to track the repair to that component between the aircraft.

The database 10 can be used by other aircraft related systems such as an on-board electronic flight bag 11, for example, for use by aircrew during pre-flight preparations.

The referenced image 6 can further be manipulated by the algorithm 8 to create an image layer 12 over the corresponding area 13 in the model 9, by aligning the known reference points. The algorithm 8 adjusts one or more image parameters (such as image size, perspective, etc.) to align the reference points on the image 6 with the corresponding reference points identified in the model 9, thereby providing an exact correlation with the model, as shown in FIG. 1. Once the image 6 and model 9 correlation has been established, the location of the damage 4 can be transferred directly into the model 9 as an aircraft specific damage layer 14. The damage layer 14 and image layer 12 can be selectively displayed over the model 9.

The damage layer 14 contains all damages and provides a permanent historical record together with all required supporting evidence and information. Data for populating the damage layer 14 is stored in the database 10. The damage layer 14 displays each damage location as a symbol. The symbols can be coded to denote the severity of the damage, the repair status etc. using different symbol shapes, colours etc.

With the damage layer 14 and the real image layer 12 laid over the model generated image 13, manipulation of the 3D model 9 (i.e. flipping) can allow visibility of the internal airframe structure 15 (from the model 9) behind the damage 4. This is particularly beneficial as it aids with any engineering decision making and to accurately plan any follow up repair action that may be required. Previously, errors due to inaccurate recording of the damage location has made it difficult, if not impossible, to determine what the engineer may find behind the damage during a repair operation. Overrunning repair operations can lead to operational delays which cause disruption and lost revenue. The ability to accurately record the damage location and to manipulate the model 9 enables the user to assess the risk of secondary damage to, for example, components behind the damage structure, and to plan the total size of the task for any repair work.

This manipulation of the model 9 having the damage layer 14 and image layer 12 can be performed by several interested parties. For example, it could be performed using the portable device 2 by the ground crew during the inspection of the aircraft 1. It could be performed by the aircraft engineers tasked with repairing the damage. It could be performed by the aircraft manufacturer to ensure that the intended repair is appropriate and to check that the repair has been correctly carried out. As can be seen, it is a versatile tool that can be used in a variety of ways by many users.

The database 10 itself can include a greatly simplified version of the model 9. For example, simplified DMU file data (such as 3dxml format) can allow for viewing on either portable maintenance devices, such as the device 2, or onboard the aircraft through integrated maintenance systems. In this way, the device 2 need not be capable of storing the full model 9 file, but instead use the simplified version from the database 10. This broadens the number of devices which could access the information stored in the damage database 10. For example, the full model 9 will generally include details of every component of the aircraft. For the purpose of damage recording, only the structure immediately behind the outer surface of the aircraft is likely to be of use and so the simplified version of the model can omit huge numbers of aircraft components.

The information stored in the database 10 would also form an electronically generated "Dent & Buckle" chart for the specific aircraft 1 which would be available to the aircrew.

As well as using the algorithm 8 to record new damages to the aircraft 1, the algorithm can be reversed to allow damages to be re-identified on the airframe structure in real time, to provide visual referencing against the airframe. This is important since, during each inspection of the aircraft 1, it is important that previously identified damages can be checked off so that the ground crew can concentrate on any new damages which may have appeared. The time available for the inspection is short and so tools to optimise the inspection process are particularly useful in avoiding aircraft turnaround delays.

This is achieved by the using the damages layer 14 correlated to, and displayed over, a live stream digital image of the aircraft 1. This live image would be produced by a digital image device, such as the web cam device 3, or similar. Video images captured by the device 3 can be displayed on the portable device 2 during the inspection, and previously recorded damages in the database 10 are displayed in the damages layer 14 over the real time video image of the aircraft 1. Any new damages, or changed damages, to that previously recorded can therefore be most easily identified and recorded in the manner set out above.

Although the invention has been described above with reference to one or more preferred embodiments, it will be appreciated that various changes or modifications may be made without departing from the scope of the invention as defined in the appended claims.

The invention claimed is:

1. A method of recording the location of a point of interest on an object, the method comprising:
   capturing a digital image of an object manufactured according to a design specification and having a point of interest;
   marking the position of the point of interest on the captured image;
   accessing a three-dimensional virtual design model of the object;
   aligning the image with the model;
   calculating the location of the point of interest with respect to the model based upon the position of the point of interest marked on the captured image using an algorithm; and
   recording the calculated point of interest location.

2. A method according to claim 1, wherein the point of interest is marked on the captured image by a point of interest recognition routine.

3. A method according to claim 1, wherein the point of interest is marked on the captured image manually.

4. A method according to claim 1, wherein the image is prepared by stitching multiple images, including at least a reference view of at least part of the object, and a detailed view of the point of interest.

5. A method according to claim 1, wherein the image is automatically aligned with the model by identifying reference points on the image and adjusting one or more image parameters to align the reference points with corresponding points identified in the model.

6. A method according to claim 1, wherein the point of interest location data is recorded in an object specific point of interest layer associated with the model.

7. A method according to claim 6, wherein the object specific point of interest layer includes text and/or image(s) associated with each point of interest location.

8. A method according to claim 6, further comprising displaying the object specific point of interest layer over the three-dimensional model.

9. A method according to claim 8, wherein the object specific point of interest layer includes the captured image, and the displayed model shows the aligned image rendered on the model.

10. A method according to claim 6, further comprising displaying the object specific point of interest layer over, and aligned with, a live stream digital image of the object.

11. A method according to claim 8, wherein the point of interest location data in the object specific point of interest layer is displayed as a symbol.

12. A method according to claim 1, wherein the calculated point of interest location is recorded in an object specific point of interest database or logbook.

13. A method according to claim 12, wherein the object specific database or logbook includes text and/or image(s) associated with each point of interest location.

14. A method according to claim 12, wherein the object specific database includes model file data.

15. A method according to claim 1, wherein the point of interest is damage to the object.

16. A method according to claim 1, wherein the object is a vehicle, or a part thereof.

17. A system for recording the location of a point of interest on an object manufactured according to a design specification, the system comprising:
   a digital image capturing device;
   a processor; and
   a non-transitory storage device, wherein the storage device has stored therein a three-dimensional virtual design model of the object and instructions for the processor to perform the steps of:
   retrieving a captured digital image of the object having the point of interest;
   marking the position of the point of interest on the captured image;
   accessing the three-dimensional virtual model of the object;
   aligning the image with the model;
   running an algorithm to calculate the location of the point of interest with respect to the model based upon the position of the point of interest marked on the captured image; and
   recording the calculated point of interest location.

18. A system according to claim 17, wherein the calculated point of interest location data is recorded in an object specific point of interest layer associated with the model, and/or an object specific point of interest database or logbook.

19. A system according to claim 17, further comprising a display device for displaying at least one of the calculated point of interest location data over the three-dimensional model, and a digital image of the object.

20. A method to correlate a point of interest on an object to a point on a three dimensional (3D) model of the object, the method comprising:
   capturing a two dimensional (2D) digital image of a surface of the object, wherein the captured 2D image includes an image of a point of interest on the surface of the object;
   marking the image to designate the point of interest on the 2D digital image;
   accessing a three-dimensional virtual design model of the object;
   aligning the 2D image with the 3D model, wherein the alignment includes matching the surface shown in the 2D image to a corresponding surface on the 3D model;
   after the alignment, calculating the position on the 3D model corresponding to the marked point of interest on the 2D digital image, and recording the calculated position of the point of interest on the 3D model.

* * * * *